June 20, 1950     J. J. WARDRIP     2,512,002
FISHING FLOAT AND LINE CATCH
Filed Dec. 5, 1947
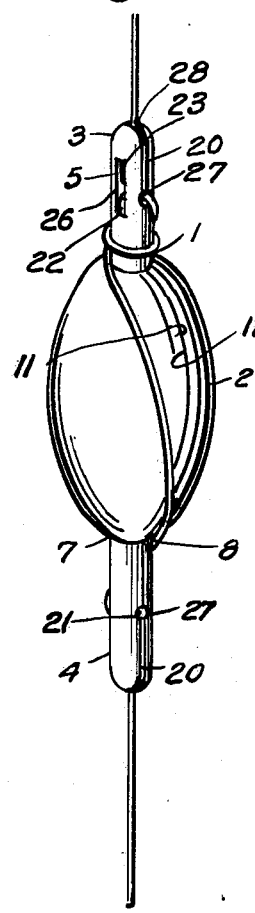
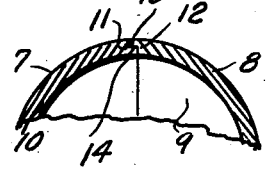
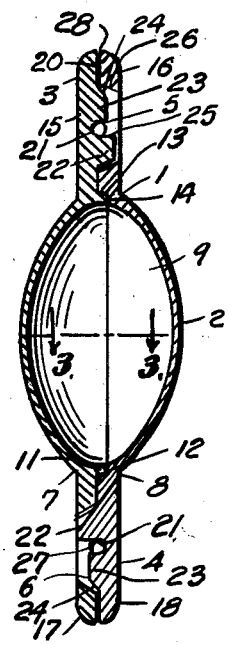
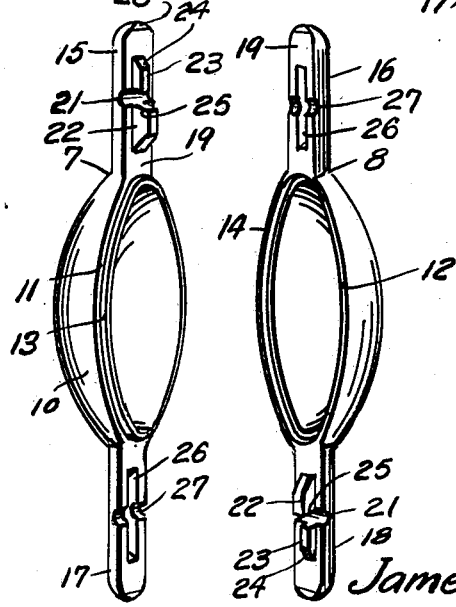
Inventor
James J. Wardrip,
By Fishburn & Mullendore
Attorneys Patented June 20, 1950

2,512,002

UNITED STATES PATENT OFFICE 2,512,002

FISHING FLOAT AND LINE CATCH

James J. Wardrip, Eureka, Kans.

Application December 5, 1947, Serial No. 789,783

8 Claims. (Cl. 43—44.90)

This invention relates to fishing floats and has for its principal object to provide a float with a line catch by which the float is readily attached to a line and which results in a coaxial relationship of the line and float.

Other objects of the invention are to provide a float with a line catch which is readily released from the line when adjusting the float on the line; to provide a float with a line catch which does not weaken the line at the point of attachment; and to provide a float wherein the line catches are formed integrally with the body of the float.

In accomplishing these and other objects of the invention hereinafter pointed out, I have provided improved structure, the preferred form of which is illustrated in the accompanying drawing wherein:

Fig. 1 is a perspective view of a fishing float equipped with line catches in accordance with the present invention.

Fig. 2 is a vertical section through the float.

Fig. 3 is a fragmentary section through the float, particularly illustrating a preferred form of joint between the complementary members forming the float.

Fig. 4 is a perspective view of the complementary members composing the float prior to interconnection thereof.

Referring more in detail to the drawings:

1 designates a float including a hollow bulb-shaped body 2 and coaxial end pins 3 and 4 that are provided with line catches 5 and 6 constructed in accordance with the present invention. The float is preferably formed of complementary sections 7 and 8 to facilitate construction thereof, permit manufacture from plastic materials, and to provide an air chamber 9 within the body portion 2 of the float. The members 7 and 8 are of substantially the same construction but are reversely arranged with respect to each other and each includes a shell 10 forming substantially one-half of the portion 2 as indicated in Fig. 4 and are provided with interengaging rims 11 and 12, one of which has a continuous tongue 13 that is adapted to engage within a continuous shoulder 14 so that the parts may be secured together with a suitable sealing material to provide a leaktight joint encircling the air chamber 9. Formed integrally and projecting from each end of the respective members are projections 15—16 and 17—18 of substantially semi-circular cross section and having flat faces 19 located in substantially the plane of the rim portions 11 and 12 of the shell portions 10 so that when the shell portions are secured together the projections 15—16 and 17—18 provide the substantially semi-circular pins 3 and 4. The faces 19 are unsecured and are spaced slightly apart as at 20 so as to pass a line therebetween in securing the float in a line as later described.

Formed on the projections 15 and 18 on the respective sides of transverse grooves 21 are tongues 22 and 23. The tongues 23 are located on the outer side of the grooves 21 and have less depth than the tongues 22 that are located on the opposite sides of the grooves 21. The outer ends of the tongues 23 are tapered as at 24 to facilitate guiding of a line thereover when the line is passed through the slots 20 formed between the projections. The inner ends of the tongues 23 extend at substanially right angles to the faces 19 to close the slots 20 relative to the transverse grooves 21. The tongues 22 also have right angular inner ends 25 which form stops to prevent the line from passing the grooves 21 as later described. The tongues 22 and 24 thus described are received in the respective ends of slots 26 that extend through the projections 16 and 17 in intersecting relation with transverse grooves 27 that register with the grooves 21 of the other projections. The outer ends of the faces 19 are bevelled as indicated at 28 to facilitate entrance of a line therebetween.

In assembling the float, a suitable cement material is applied to the shoulders 14 and the members 10 placed in juxtaposition so that the tongue 13 engages within the rim of the member 12 to seat upon the shoulder 14. The adjacent faces of the projections 19 are left free to provide the slots in which the line is to be inserted.

In applying the line and providing for a loose connection of the float with the line, portions of the line on the respective sides of the float are passed transversely through the slots 20 and when sufficient tightness is drawn in the line, the line engages the inclined faces 24 to cam the tongues 23 outwardly and permit passing of the line so that it engages under the shoulder 25 and passes into the registering grooves 21 and 27, the line being prevented from passing on through the slot since the tongues 25 project far enough into the slots 26 to stop the line when it registers with the transverse grooves. After insertion of the line, the ends may be drawn retractively through the slots 20 so that they extend alongside of the tongues 23 and project substantially coaxially from the ends of the pins 3 and 4 as best shown in Fig. 1. The float is then free to be moved on the line.

If a tight float is desired, an intermediate portion of the line may be wrapped about one of the pins as shown in Fig. 1 so that when tension is applied to the line the snubbing action of the wrap prevents sliding of the line relative to the flows.

From the foregoing it is obvious that I have provided a float with a line catch that is of simple and inexpensive construction and which permits a substantial axial pull on the line with respect to the pins of the float. It is also obvious that when the line enters the registering grooves it is comparatively free and there are substantially no sharp joints in the line on which the line might be broken when the line is in tension.

What I claim and desire to secure by Letters Patent is:

1. A float comprising a buoyant body having complementary axial projections at opposite ends forming line anchoring pins, one of said complementary projections at each end of said body having a tongue and a transverse groove between the tongue and said body, the other complementary projections having transverse grooves registering with the first-named grooves and provided with slots for receiving said tongues.

2. A float comprising complementary sections having shell-like portions forming a hollow buoyant body and having complementary axial projections at opposite ends forming line anchoring pins, one of said complementary projections at each end of said body having a tongue and a transverse groove on the side of the tongue adjacent the shell-like portions, the other complementary projections having transverse grooves registering with the first-named grooves and provided with slots for receiving said tongues.

3. A float comprising complementary sections having shell-like portions forming a hollow buoyant body and having complementary axial projections forming a line anchoring pin on said body, one of said complementary projections having a transverse groove and spaced tongues on opposite sides of said transverse groove, said transverse groove being adapted to receive a line therein when passed between said complementary axial projections and under the tongue on the entrance side of the transverse groove, said other complementary projection having a slot for receiving said tongues.

4. A float comprising complementary sections having shell-like portions forming a hollow buoyant body and having complementary axial projections forming pins at opposite ends of said body, one of said complementary projections having a transverse groove and spaced tongues on opposite sides of said transverse groove to receive a line therein passed between said complementary axial projections and over the tongue on the entrance side of the transverse groove, said other complementary axial projections having a recess for receiving said tongues and having a transverse groove registering with the first-named groove.

5. A float comprising complementary sections having shell-like portions provided with an interfitting tongue and shoulder to form a leaktight joint when the sections are joined together, complementary axial projections at opposite ends of said shell-like portions to provide split line-anchoring pins, and line catches on said projections, said line catches comprising a tongue on one projection fitting within a recess on a complementary projection for retaining a line in the split of said pins.

6. A float comprising complementary sections having shell-like portions provided with an interfitting tongue and shoulder to form a leaktight joint when the sections are joined together, complementary axial projections at opposite ends of said shell-like portions to provide split line-anchoring pins, and line catches on said projections, said line catches comprising a tongue on one projection fitting with a recess on a complementary projection for retaining a line in the split of said pins, and said projections having transverse grooves to accommodate the line.

7. A float comprising complementary sections having shell-like portions provided with an interfitting tongue and shoulder to form a leaktight joint when the sections are joined together, complementary axial projections at opposite ends of said shell-like portions to provide split line-anchoring pins, line catches on said projections, said line catches comprising a tongue on one projection fitting within a recess on a complementary projection for retaining a line in the split of said pins, said projections having transverse grooves to accommodate the line, and tongues on said projections at the sides of the grooves nearest the shell portions and projecting a greater distance into the recesses to stop the line when the line is brought over the first-named tongues and is in registry with the transverse grooves.

8. A float comprising a body having a line anchoring pin including complementary projections extending from said body and having facing sides, one of said projections having a transverse groove in said facing side thereof and cooperating with a part of the other projection to form a transverse line opening for receiving a line therein when passed between said facing sides of the projections, and spaced tongues on the facing side of one of the projections on opposite sides of said transverse groove, and said other projection having a slot for receiving said tongues.

JAMES J. WARDRIP.

REFERENCES CITED

The following references are of record in the file of this patent:

UNITED STATES PATENTS

| Number | Name | Date |
| --- | --- | --- |
| 240,611 | Redfield | Apr. 26, 1881 |
| 241,150 | Norwood | May 10, 1881 |
| 2,322,241 | Kurz | June 22, 1943 |
| 2,481,346 | Rigby | Sept. 6, 1949 |